(12) United States Patent
Hwang et al.

(10) Patent No.: US 10,915,834 B2
(45) Date of Patent: Feb. 9, 2021

(54) CONTEXT-BASED POLICY TERM ASSISTANCE

(71) Applicant: International Business Machines Corporation, Armonk, NY (US)

(72) Inventors: Inseok Hwang, Austin, TX (US); Su Liu, Austin, TX (US); Eric J. Rozner, Austin, TX (US); Chin Ngai Sze, Austin, TX (US)

(73) Assignee: International Business Machines Corporation, Armonk, NY (US)

(*) Notice: Subject to any disclaimer, the term of this patent is extended or adjusted under 35 U.S.C. 154(b) by 709 days.

(21) Appl. No.: 15/617,448

(22) Filed: Jun. 8, 2017

(65) Prior Publication Data

US 2018/0357549 A1 Dec. 13, 2018

(51) Int. Cl.
| | |
|---|---|
| *G06N 20/00* | (2019.01) |
| *G06Q 50/18* | (2012.01) |
| *G06N 5/00* | (2006.01) |
| *G06Q 40/08* | (2012.01) |
| *G06F 40/279* | (2020.01) |
| *H04L 29/08* | (2006.01) |

(52) U.S. Cl.
CPC ........... *G06N 20/00* (2019.01); *G06F 40/279* (2020.01); *G06N 5/003* (2013.01); *G06Q 40/08* (2013.01); *G06Q 50/18* (2013.01); *H04L 67/1097* (2013.01); *H04L 67/18* (2013.01)

(58) Field of Classification Search
CPC .......... G06Q 40/08; G06Q 50/18; G06N 5/04; G06N 99/005; G06F 17/2705; H04L 67/18
See application file for complete search history.

(56) References Cited

U.S. PATENT DOCUMENTS

| | | |
|---|---|---|
| 6,934,715 B2 | 8/2005 | Kalmes et al. |
| 7,155,419 B2 | 12/2006 | Blackman et al. |
| 7,356,460 B1 * | 4/2008 | Kennedy ............. G06Q 10/087 704/1 |
| 7,480,638 B1 | 1/2009 | Sze |

(Continued)

OTHER PUBLICATIONS

Appendix P, List of IBM Patents or Patent Applications Treated as Related, 2 pages, dated Jan. 17, 2018.

(Continued)

*Primary Examiner* — Kamran Afshar
*Assistant Examiner* — Ying Yu Chen
(74) *Attorney, Agent, or Firm* — Donald G. Weiss

(57) ABSTRACT

In an approach to parsing and analyzing contracts, one or more computer processors receive a policy agreement. The one or more computer processors parse the policy agreement for terms. The one or more computer processors compile a list of items associated with the terms in the policy agreement. The one or more computer processors associate each item of the list of items with one or more categories, wherein each category of the one or more categories defines an extent of coverage for each item. The one or more computer processors determine whether an item of a user is present in the list of items associated with the one or more terms in the policy agreement. The one or more computer processors determine the categories associated with the item. The one or more computer processors determine the extent of coverage for the item of the user based on the determined categories.

14 Claims, 6 Drawing Sheets

(56) References Cited

U.S. PATENT DOCUMENTS

| | | |
|---|---|---|
| 8,756,117 B1 | 6/2014 | Ballaro et al. |
| 9,037,578 B2 | 5/2015 | Brust et al. |
| 9,495,709 B2 | 11/2016 | Borden et al. |
| 9,923,931 B1 | 3/2018 | Wagster |
| 2002/0091539 A1 | 7/2002 | Yin |
| 2003/0115080 A1 | 6/2003 | Kasravi et al. |
| 2005/0182736 A1* | 8/2005 | Castellanos ........... G06F 40/295 705/80 |
| 2006/0287966 A1 | 12/2006 | Srinivasaraghavan et al. |
| 2007/0150073 A1 | 6/2007 | Dawson |
| 2011/0040579 A1* | 2/2011 | Havens ................ G06Q 10/08 705/4 |
| 2011/0161119 A1 | 6/2011 | Collins |
| 2012/0232935 A1 | 9/2012 | Voccola |
| 2014/0053069 A1 | 2/2014 | Yan |
| 2016/0005130 A1 | 1/2016 | Devereaux et al. |
| 2016/0028681 A1* | 1/2016 | Freire .................. G06Q 50/01 709/204 |
| 2016/0379309 A1* | 12/2016 | Shikhare ................ G06Q 10/04 705/4 |
| 2016/0381046 A1 | 12/2016 | Gorelik et al. |
| 2018/0357550 A1 | 12/2018 | Hwang |

OTHER PUBLICATIONS

Hwang et al., "Context-Based Policy Term Assistance", U.S. Appl. No. 15/850,256, filed Dec. 21, 2017, 36 pages.

Mell et al., "The NIST Definition of Cloud Computing", Recommendations of the National Institute of Standards and Technology, NIST Special Publication 800-145, Computer Security Division Information Technology Laboratory, National Institute of Standards and Technology, Gaithersburg, MD 20899-8930, Sep. 2011, 7 pages.

Kasia Manolas, "Late Rent Fees and Grace Periods", Apr. 21, 2017, https://www.avail.co/education/guides/complete-guide-to-rent-collection/late-rent-fees-and-grace-periods, p. 1-54. (Year: 2017).

\* cited by examiner

CONTEXT-BASED POLICY TERM ASSISTANCE

BACKGROUND OF THE INVENTION

The present invention relates generally to the fields of natural language processing and machine learning, and more particularly to parsing and analyzing complex coverage policies for key terms.

Natural language processing combines computer science, artificial intelligence, and computational linguistics to analyze the interaction between humans and computers. Natural language processing (NLP) aims to bridge the gap between human language and machine perception by improving natural language understanding, natural language generation, the connection between language and machine perception, the management of human-computer dialog systems, or any combination thereof.

Machine learning involves the use of pattern recognition and computational learning theory to construct algorithms capable of making predictions from historical data and adapting to better process data by learning from compiled data. Machine learning uses data analytics to process data to extract information from unstructured or loosely structured data. Data analytics may also include the use of predictive analytics to predict user behavior by finding behavioral trends in historical data.

SUMMARY

Embodiments of the present invention disclose a method, a computer program product, and a system for receiving a policy agreement. The one or more computer processors parse the policy agreement for one or more terms. The one or more computer processors compile a list of items associated with the one or more terms in the policy agreement. The one or more computer processors associate each item of the list of items with one or more categories, wherein each category of the one or more categories defines an extent of coverage for each item. The one or more computer processors determine whether an item of a user is present in the list of items associated with the one or more terms in the policy agreement. Responsive to determining that the item of the user is present in the list of items associated with the one or more parsed terms in the policy agreement, the one or more computer processors determine the one or more categories associated with the item. The one or more computer processors determine the extent of coverage for the item of the user based on the determined one or more categories.

DETAILED DESCRIPTION

Modern day coverage policies involve complex agreements containing many sets of interconnected policy terms. In complex agreements, covered users often do not fully understand the implications of each clause of the agreement and the true scope of coverage given all of the exceptions, dependencies, and any other clauses in the policy terms. To remedy this issue, machine learning and natural language processing may be applied to coverage policies to extract all relevant data and analyze the data to determine the true scope of coverage. By applying machine learning and natural language processing to coverage policies, a covered user may receive a large variety of relevant coverage information in a large variety of ways, such as through text alerts based on geolocation and time of day. Further, the relationships between multiple distinct contracts can also be analyzed to determine where coverage does and does not overlap to further provide a user with a more complete picture of obligations, liabilities, and indemnities associated with a user. Embodiments of the present invention parse contractual language to determine the scope of coverage from one or more policy terms individually or in combination. As a result, embodiments of the present invention provide covered users with dynamic coverage alerts to better assist in the decision making process. Implementation of embodiments of the invention may take a variety of forms, and exemplary implementation details are discussed subsequently with reference to the Figures.

Figure 1:
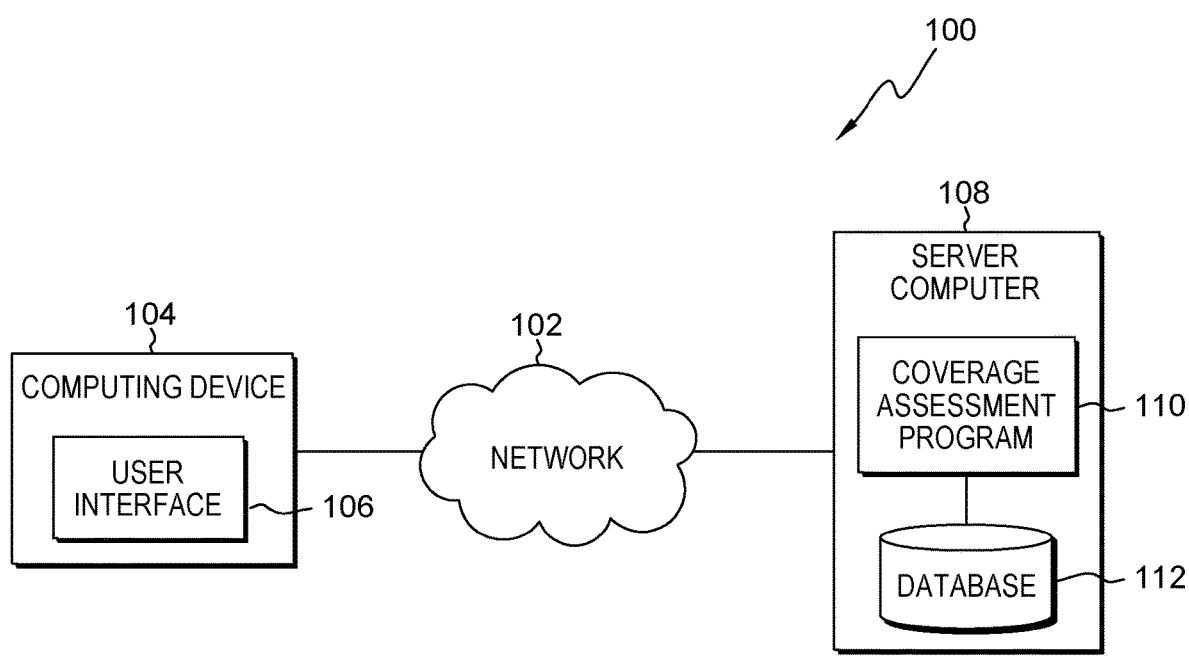
FIG. 1 is a functional block diagram illustrating a distributed data processing environment, in accordance with an embodiment of the present invention.

FIG. 1 is a functional block diagram illustrating a distributed data processing environment, generally designated 100, in accordance with one embodiment of the present invention. The term "distributed" as used in this specification describes a computer system that includes multiple, physically distinct devices that operate together as a single computer system. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Distributed data processing environment 100 includes computing device 104 and server computer 108 interconnected over network 102. Network 102 can be, for example, a telecommunications network, a local area network (LAN), a wide area network (WAN), such as the Internet, or a combination of the three, and can include wired, wireless, or fiber optic connections. Network 102 can include one or more wired and/or wireless networks that are capable of receiving and transmitting data, voice, and/or video signals, including multimedia signals that include voice, data, and video information. In general, network 102 can be any combination of connections and protocols that will support communications between computing device 104 and server computer 108, and other computing devices (not shown) within distributed data processing environment 100.

Computing device 104 can be a laptop computer, a tablet computer, a smart phone, or any programmable electronic computing device capable of communicating with various components and devices within distributed data processing environment 100, via network 102. In general, computing device 104 represents any programmable electronic computing device or combination of programmable electronic computing devices capable of executing machine readable program instructions, manipulating executable machine readable instructions, and communicating with server computer 108 and other computing devices (not shown) within distributed data processing environment 100 via a network, such as network 102. Computing device 104 includes an instance of user interface 106. Computing device 104 and user interface 106 allow a user to interact with coverage assessment program 110 in various ways, such as sending program instructions, receiving messages, send data, and receive data.

User interface 106 provides an interface to coverage assessment program 110 on server computer 108 for a user of computing device 104. In one embodiment, user interface 106 may be a graphical user interface (GUI) or a web user interface (WUI) and can display text, documents, web browser windows, user options, application interfaces, and instructions for operation, and include the information (such as graphic, text, and sound) that a program presents to a user and the control sequences the user employs to control the program. In another embodiment, user interface 106 may also be mobile application software that provides an interface between a user of computing device 104 and server computer 108. Mobile application software, or an "app," is a computer program designed to run on smart phones, tablet computers and other mobile devices. In an embodiment, user interface 106 enables the user of computing device 104 to register with and configure coverage assessment program 110 to enable tracking of the scope of coverage of a user of computing device 104. In another embodiment, user interface 106 may enable the user of computing device 104 to provide coverage assessment parameters to coverage assessment program 110.

Server computer 108 can be a standalone computing device, a management server, a web server, a mobile computing device, or any other electronic device or computing system capable of receiving, sending, and processing data. In other embodiments, server computer 108 can represent a server computing system utilizing multiple computers as a server system, such as in a cloud computing environment. In another embodiment, server computer 108 can be a laptop computer, a tablet computer, a netbook computer, a personal computer (PC), a desktop computer, a personal digital assistant (PDA), a smart phone, or any other programmable electronic device capable of communicating with computing device 104 and other computing devices (not shown) within distributed data processing environment 100 via network 102. In another embodiment, server computer 108 represents a computing system utilizing clustered computers and components (e.g., database server computers, application server computers, etc.) that act as a single pool of seamless resources when accessed within distributed data processing environment 100. Server computer 108 includes coverage assessment program 110 and database 112. Server computer 108 may include internal and external hardware components, as depicted and described in further detail with respect to FIG. 3.

Coverage assessment program 110 receives a policy agreement. A policy agreement may be any contractual agreement containing any variety of policy terms. For example, coverage assessment program 110 may receive a car rental contract, a loan contract, or an insurance policy. Coverage assessment program 110 parses the policy agreement for terms of interest. Coverage assessment program 110 may use natural language processing to analyze the written policy terms to find terms associated with particular classifications. For example, the terms may be classified as restrictions, exceptions, indemnities, covered, and non-covered.

Coverage assessment program 110 compiles one or more lists of covered and non-covered items associated with one or more categories, such as one or more lists associated with an insured car. Coverage assessment program 110 analyzes the one or more lists of covered and non-covered items to determine which items, if any, are covered. Responsive to determining that one or more items are not covered, coverage assessment program 110 stores coverage terms associated with the one or more non-covered items. For example, coverage assessment program 110 may store a list of non-covered items in a database, such as database 112, for later retrieval. Responsive to coverage assessment program 110 determining that one or more items are covered, coverage assessment program 110 determines the extent of coverage associated with the one or more covered items. Items may be any subject associated with the agreement. For example, coverage assessment program may determine a monetary value, a time frame, and a list of covered components for a car insurance policy. Coverage assessment program 110 stores the coverage terms associated with the covered and non-covered items. For example, coverage assessment program 110 may store coverage terms associated with a car insurance policy indicating up to 100,000 dollars of coverage for any bodily damage resulting from a car accident in database 112.

Coverage assessment program 110 generates rules associated with the coverage terms for the item. Rules may be any boundary associated with an item, such as a geolocation-based restriction, a geolocation-based allowance, a time-based restriction, and/or a time-based allowance. For example, rules associated with a mobile phone plan may include data restrictions of two gigabytes per month. Upon exceeding two gigabytes, a user breaks the rule. Coverage assessment program 110 designates an item-specific response upon a violation of a rule. Item-specific responses may be in the form of a set of program instructions instructing coverage assessment program 110 to execute particular functions upon the occurrence or non-occurrence of an event. For example, a rule may be a program instruction instructing coverage assessment program 110 to send a warning text to a user when the geolocation of the user falls outside of a coverage area for insurance, such as a coverage area outlined in a car insurance policy.

Coverage assessment program 110 monitors one or more data sources associated with a user for rule violations. For example, coverage assessment program 110 may monitor the geolocation, the time of day, and the day of the week of a smartphone associated with a user to check whether the user stays within a particular area designated under a car insurance policy as covered. Monitoring may be continuous, periodic, or any combination of continuous and periodic monitoring. Coverage assessment program 110 determines whether a rule has been violated. Responsive to determining that a user did not violate a rule, coverage assessment program 110 returns to monitor one or more data sources associated with a user for rule violations. Responsive to coverage assessment program 110 determining that a rule violation has occurred, coverage assessment program 110 executes one or more item-specific responses. For example, coverage assessment program 110 may send a warning text message to a mobile phone, a warning email to an email account, or send a small report highlighting how the user violated a contractual provision. Coverage assessment program 110 sends the one or more coverage terms associated with the item to the user for review. For example, coverage assessment program 110 may send a user an email containing a portable document format (PDF) file of the policy agreement. In the depicted embodiment, coverage assessment program 110 resides on server computer 108. In another embodiment, coverage assessment program 110 may reside on computing device 104 provided database 112 is accessible by coverage assessment program 110. Coverage assessment program 110 is depicted and described in further detail with respect to FIG. 2 and FIG. 3.

Database 112 is a repository for data used and stored by coverage assessment program 110. In the depicted embodiment, database 112 resides on server computer 108. In another embodiment, database 112 may reside elsewhere within distributed data processing environment 100 provided coverage assessment program 110 has access to database 112. A database is an organized collection of data. Database 112 can be implemented with any type of storage device capable of storing data and configuration files that can be accessed and utilized by server computer 108, such as a database server, a hard disk drive, or a flash memory. Database 112 stores coverage data of a user. Database 112 also stores registration and configuration data inputted by a user of computing device 104 via user interface 106 for the purpose of controlling how coverage assessment program 110 creates rules, responds to violations, and any other variable associated with coverage assessment program 110. Database 112 may also store historical coverage terms of policy agreements associated with a user and any other data relevant to coverage assessment program 110.

Figure 2:
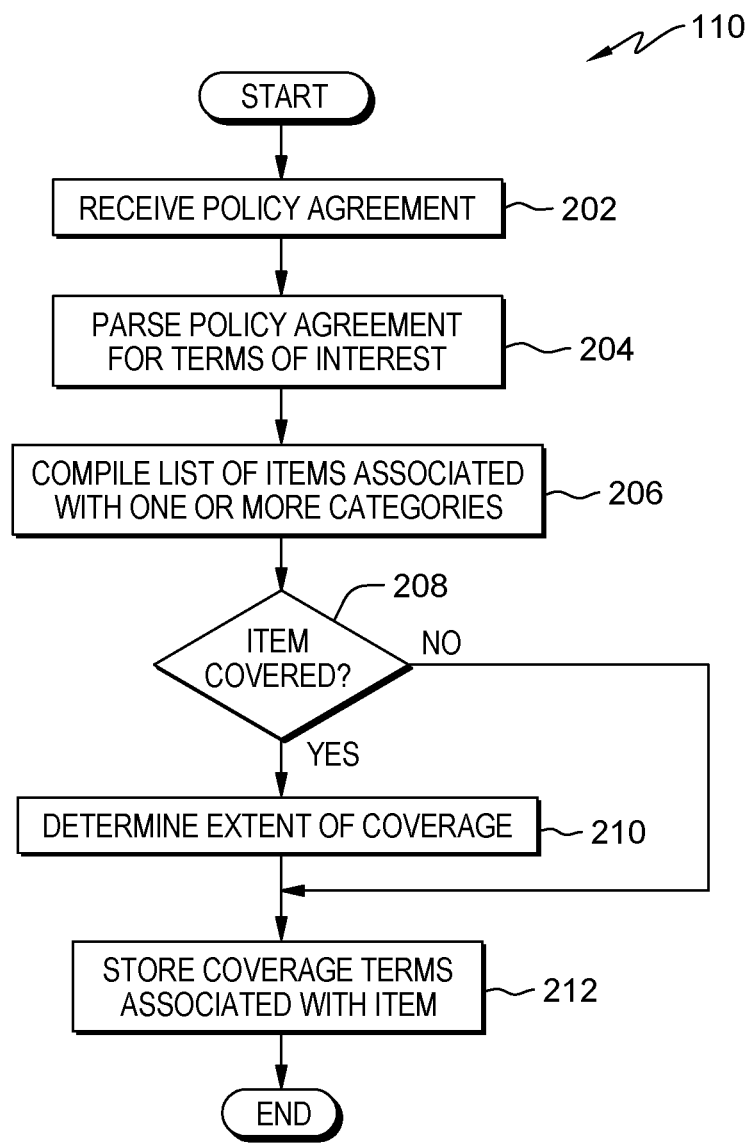
FIG. 2 is a flowchart depicting operational steps of a coverage assessment program, on a server computer within the distributed data processing environment of FIG. 1, for parsing and analyzing policy terms to determine coverage terms.

FIG. 2 is a flowchart depicting operational steps of coverage assessment program 110, on server computer 108 within distributed data processing environment 100 of FIG. 1, a program for parsing and analyzing policy terms to provide user-specific coverage alerts, in accordance with an embodiment of the present invention. Coverage assessment program 110 starts when coverage assessment program 110 receives a policy agreement.

Coverage assessment program 110 receives a policy agreement (step 202). A policy agreement may be any contractual agreement containing any variety of policy terms associated with a user. For example, coverage assessment program 110 may receive a car rental contract, a loan contract, or an insurance policy. In one embodiment, coverage assessment program 110 may receive one or more overlapping or complementary policy agreements. For example, coverage assessment program 110 may receive a rental car insurance policy from a rental car company and a credit card benefits agreement from a credit card company via network 102. The rental car company may provide 50,000 dollars of collision insurance, and the credit card company may provide a user an additional 25,000 dollars of collision insurance on top of rental car insurance.

In another embodiment, coverage assessment program 110 may receive a policy agreement directly from a user. For example, a user may scan and transfer a PDF file of an end user license agreement for a cloud-based storage service to coverage assessment program 110. In yet another embodiment, coverage assessment program 110 may receive a policy agreement automatically from a contracting party. For example, a manufacturer of a car purchased by a user may send the policy agreement associated with the car to coverage assessment program 110 upon the completion of the sale.

In an alternative embodiment, coverage assessment program 110 may monitor various data sources for policy agreements associated with a user. For example, coverage assessment program 110 may monitor an email account associated with a user to extract disclaimers placed in emails sent by various companies and policy agreements sent through email after a user signs up for a web-based service. However, coverage assessment program 110 is not limited to the embodiments discussed herein and may receive a policy agreement by any method available in the art.

Coverage assessment program 110 parses the policy agreement for terms of interest (step 204). Coverage assessment program 110 may use natural language processing to analyze the written policy terms to find terms associated with particular classifications. For example, the terms may be classified as restrictions, exceptions, indemnities, covered, and non-covered. Terms of interest may include common contractual terms indicating the classification of an item to a category, such as covered, non-covered, restrictions, indemnities, and exceptions. For example, coverage assessment program 110 may parse a policy agreement for the words "exceptions include" to identify a list of exceptions to coverage following the "exceptions include".

In another example, coverage assessment program 110 may parse a policy agreement for a monetary values and the subject of the monetary values. For example, coverage assessment program 110 may parse a health insurance policy agreement and identify the word "deductible" followed by a monetary value of "$500". Based on this identification, coverage assessment program 110 may categorize the coverage terms associated with the health insurance policy agreement, such as the 500-dollar deductible under a "covered" category.

In another embodiment, coverage assessment program 110 may parse a policy agreement for language indicating liabilities upon the violation of a policy agreement. For example, coverage assessment program 110 may parse an end user license agreement (EULA) for the word "arbitration" which indicates a particular method of dispute resolution. However, coverage assessment program 110 may parse a policy agreement for any terms of interest.

Coverage assessment program 110 compiles one or more lists of items associated with one or more categories (step 206). Coverage assessment program 110 may compile one or more lists of items associated with any definable category associated with the characteristics of one or more items and is not limited to the embodiments discussed herein. For example, coverage assessment program 110 may compile a list of policy agreements under an automotive category, a health category, and a retirement category. Any policy agreements associated with the aforementioned categories may be compiled onto a respective list corresponding to the type of policy agreement, such as a car lease agreement compiled into a list associated with the automotive category. In an embodiment, coverage assessment program 110 may compile one policy agreement into multiple categories. For example, coverage assessment program 110 may compile a car lease agreement into both an automotive category and an insurance category because the car lease agreement is relevant to both categories.

Coverage assessment program 110 analyzes the one or more lists of covered and non-covered items to determine which items are covered (decision block 208). In one embodiment, coverage assessment program 110 compiles one or more lists of items associated with a covered and non-covered category in database 112. For example, coverage assessment program 110 may add a list of covered parts of an insured car (e.g. power train warranty) and a list of travel protection coverages, associated with a credit card, (e.g. monetary coverage for trip cancellation insurance) to a "covered" category on database 112. Further, coverage assessment program 110 may compile a list of liabilities associated with a EULA under a "non-covered" category.

In another embodiment, coverage assessment program 110 may categorize the same item, such as a coverage term, under both a covered and non-covered category. For example, coverage assessment program 110 may categorize a collision insurance coverage term under the covered category based on a monetary coverage amount of 50,000 dollars. However, coverage assessment program may also categorize the collision insurance coverage term under the non-covered category based on a lack of personal injury insurance resulting from a car accident. However, coverage assessment program 110 may compile one or more lists of items associated with any definable category and is not limited to the embodiments discussed herein.

Responsive to determining that one or more items are not covered, coverage assessment program 110 stores coverage terms associated with the one or more non-covered items (step 212). For example, coverage assessment program 110 may store a list of non-covered items in a database, such as database 112, for later retrieval.

Responsive to coverage assessment program 110 determining that one or more items are covered, coverage assessment program 110 determines the extent of coverage associated with the one or more covered items (step 210). Items may be the any subject associated with the agreement. The extent of coverage may be measured using any measurable variable. In one embodiment, coverage assessment program 110 may determine the extent of monetary coverage for an item. For example, coverage assessment program 110 may determine that the extent of collision insurance in a car insurance policy is 50,000 dollars of coverage if the covered driver is faultless. In another example, coverage assessment program 110 may determine that the coverage for a house in a flood insurance policy is 500,000 dollars in the event that a flood damages the house.

In another embodiment, coverage assessment program 110 may determine the extent of indemnity a user has in an agreement. For example, coverage assessment program 110 may determine that a user is fully protected from personal injury liability arising from structural issues in a work agreement with a building contractor. In yet another embodiment, coverage assessment program 110 may determine the length of coverage associated with a user in an agreement. For example, coverage assessment program 110 may determine that a lease agreement for an apartment signed by a user is good for one calendar year and the lease switched to a month to month plan after the first year.

Coverage assessment program 110 stores the coverage terms associated with the covered and non-covered items (step 212). For example, coverage assessment program 110 may store coverage terms associated with a car insurance policy indicating up to 100,000 dollars of coverage for any bodily damage resulting from a car accident in database 112. In another example, coverage assessment program 110 may store the coverage terms associated with the covered and non-covered items on a cloud-based storage system to allow computing device 104 to access the coverage terms over network 102. However, coverage assessment program 110 is not limited to the embodiments herein and may store the coverage terms associated with the covered and non-covered items in any manner available in the art.

Figure 3:
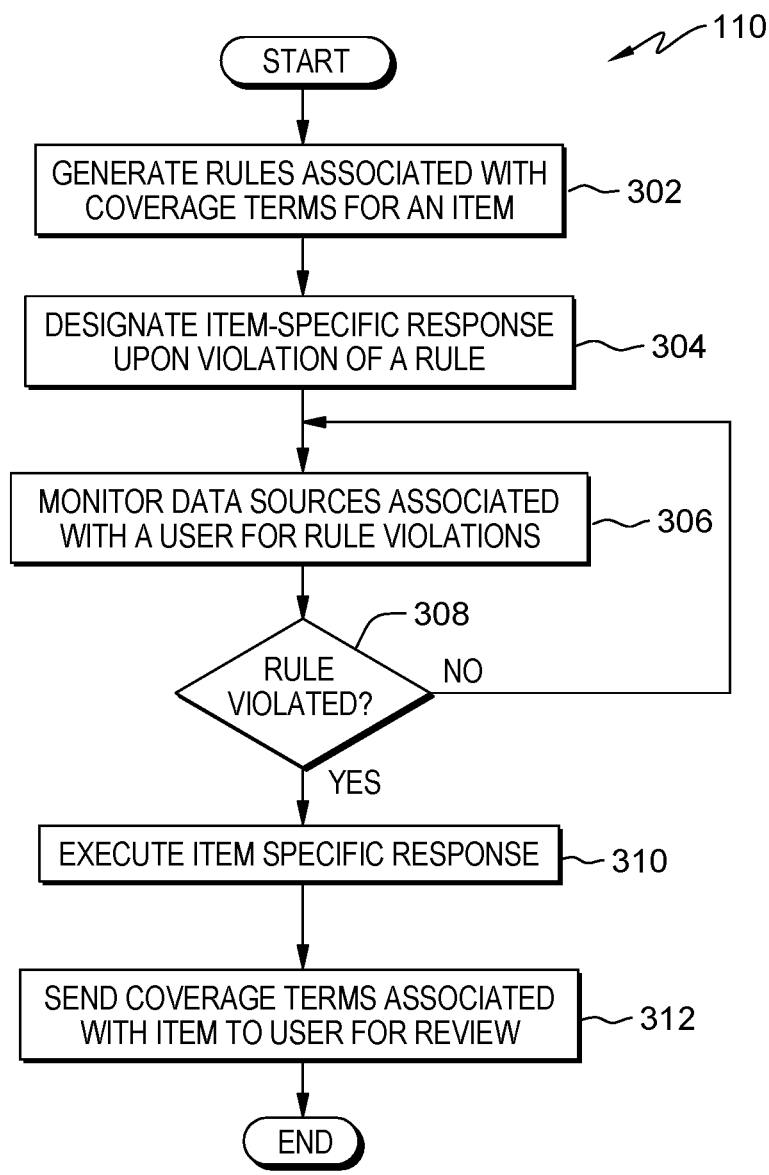
FIG. 3 is a flowchart depicting operational steps of a coverage assessment program, on a server computer within the distributed data processing environment of FIG. 1, for generate and execute item-specific responses based on coverage terms for the purpose of providing user-specific coverage alerts.

FIG. 3 is a flowchart depicting operational steps of coverage assessment program 110, on server computer 108 within distributed data processing environment 100 of FIG. 1, a program for parsing and analyzing policy terms to provide user-specific coverage alerts, in accordance with an embodiment of the present invention. A second function of coverage assessment program 110 starts when coverage assessment program 110 generates rules associated with coverage terms for an item.

Coverage assessment program 110 generates rules associated with the coverage terms for the item (step 302). Rules may be any boundary associated with an item. Rules may be generated by any method available in the art. For example, rules may be generated by using human input, machine learning, predictive analytics, or any combination thereof. Predictive analytics may include a time-series model, a supervised learning classifier, a regression analysis, a vector-based analysis, and any combination thereof. However, predictive analytics is not limited to the aforementioned analytical models and may include any analytical models known in the art. In an embodiment, coverage assessment program 110 may generate notification rules associated with the coverage terms for the item using machine learning algorithms to analyze the relationships between the coverage terms and the user. For example, coverage assessment program 110 may apply natural language processing to a contractual clause in a lease agreement stating that the lessee must notify the landlord of non-renewal of a lease sixty days prior to the end of the duration of the lease agreement. As a result, coverage assessment program 110 may generate a rule that the user violates a rule if the user does not send an email to the landlord through an email account mentioned in the lease at least 60 days before the end of the lease term.

In another embodiment, coverage assessment program 110 may generate notification rules to deliver real-time notifications upon the violation of a rule. For example, coverage assessment program 110 may apply natural language processing to a contractual clause in a car insurance policy stating that the policy holder must stay within the bounds of a certain area. As a result, coverage assessment program 110 may generate a rule that coverage assessment program 110 must send a notification in real-time to the policy holder upon a violation of the insurance policy coverage. Real-time may include instantaneous notifications and notification sent shortly after a rule violation. For example, a notification sent within three milliseconds upon the violation of a rule may be considered real-time.

In yet another embodiment, coverage assessment program 110 applies predictive analytics to generate rules associated with coverage terms for the item. For example, coverage assessment program 110 may apply a supervised learning classifier to the historically collected data to gauge the significance of a contract for water services based on the characteristics of the contract, such as a pattern of particular terms. Upon determining the significance of the water service contract is high, coverage assessment program 110 generates a more stringent rule stating that a user must pay the water bill at least ten days prior to the due date. If a user does not pay the water bill at least ten days prior to the due date, then the user breaks the rule.

Coverage assessment program 110 designates an item-specific response upon a violation of a rule (step 304). Item-specific responses may be in the form of a set of program instructions instructing coverage assessment program 110 to execute particular functions upon the occurrence or the non-occurrence of an event, such as a notification and/or an authorization hold. For example, an item-specific response may be a program instruction instructing coverage assessment program 110 to send a warning text to a user when the geolocation of the user falls outside of a coverage area for insurance, such as a coverage area outlined in a car insurance policy. In one embodiment, coverage assessment program 110 may designate a pre-configured item-specific response. For example, coverage assessment program 110 may designate that coverage assessment program 110 must send a warning email and a copy of the full policy agreement upon the violation of a rule, such as paying a bill at least three days before the due date, because the policy agreement falls under the automotive category.

In another embodiment, coverage assessment program 110 may designate an item-specific response based on predictive analytics. For example, coverage assessment program 110 may designate that coverage assessment program 110 must send an email reminding a user of a mobile phone plan payment ten days, three days, and one day prior to the due date if the user has not paid the mobile phone bill based on user behaviors predicted by a time-series forecast and a regression analysis. In another example, coverage assessment program may designate that coverage assessment program 110 must send an email to a user upon any purchases of jewelry, which breaks a rule stating that the user may not purchase jewelry, to remind the user that jewelry is not covered under home insurance policy agreement associated with the user. However, coverage assessment program 110 may designate any item-specific response corresponding to the violation of a rule and is not limited to the embodiments discussed herein.

Coverage assessment program 110 monitors one or more data sources associated with a user for rule violations (step 306). In one embodiment, coverage assessment program 110 may monitor the web traffic and email content of a user to detect any rule violations. For example, coverage assessment program 110 may detect a potential rule violation when coverage assessment program 110 parses an email detailing the prohibited purchase of jewelry. In another embodiment, coverage assessment program 110 may monitor the geolocation of a user to detect any rule violations. For example, coverage assessment program 110 may monitor the geolocation, the time of day, and the day of the week of a smartphone to check whether a user stays within a particular area designated under a car insurance policy as covered. Monitoring may be continuous, periodic, or any combination of continuous and periodic monitoring. However, coverage assessment program 110 may monitor one or more data sources associated with a user by using any method available in the art and is not limited to the embodiments discussed herein.

Coverage assessment program 110 determines whether a rule has been violated (decision block 308). A rule is violated when the action taken by a user conflicts with the rule. In one embodiment, coverage assessment program 110 may determine that an action violates a rule using objective metrics, such as time, geolocation, and date. For example, coverage assessment program 110 may determine that a user driving in Nevada violates a rule that requires the insured individual to drive within a particular state for valid collision insurance. In another embodiment, coverage assessment program 110 may determine that an action violated a rule wherein the rule does not trigger upon a violation of the coverage terms associate with a user. For example, coverage assessment program 110 may determine that an action violates a rule to stay within ten miles of the state border based on a coverage term that requires the insured individual to drive within the state for valid collision insurance. In an alternative embodiment, coverage assessment program 110 may use predictive analytics to anticipate a user breaking a rule. For example, coverage assessment program 110 may predict the destination of a driver based on the current route and historical geolocation data that indicates a particular destination with eighty percent likelihood.

Responsive to determining that a user did not violate a rule, coverage assessment program 110 returns to monitor one or more data sources associated with a user for rule violations (step 306).

Responsive to coverage assessment program 110 determining that a rule violation has occurred, coverage assessment program 110 executes one or more item-specific responses (step 310). An item-specific response may be any response associated with a rule violation. Item-specific responses may be pre-configured, manually set by a user, automatically set, or any combination thereof. In one embodiment, coverage assessment program 110 may execute a pre-configured item-specific response to a rule violation. For example, coverage assessment program 110 may be pre-configured by an insurance company to send a warning text message to a mobile phone, a warning email to an email account, and send a small report highlighting how the user violated a contractual provision. In another embodiment, coverage assessment program 110 may be manually set by a user to execute an item-specific response based on the geolocation associated with the user. For example, coverage assessment program 110 may be manually set by a user to send a warning text message on a mobile phone stating the potential violation of the insurance policy associated with the user when the geolocation associated with the user falls within ten miles of the state border. However, coverage assessment program 110 may be configured to execute any item-specific response known in the art.

Coverage assessment program 110 sends the one or more coverage terms associated with the item to the user for review (step 312). In one embodiment, coverage assessment program 110 may send the one or more coverage terms to a user via network 102. For example, coverage assessment program 110 may send a user an email containing a portable document format (PDF) file of the policy agreement. However, coverage assessment program 110 may send the one or more coverage terms associate with the item to the user for review using any method known in the art.

Figure 4:
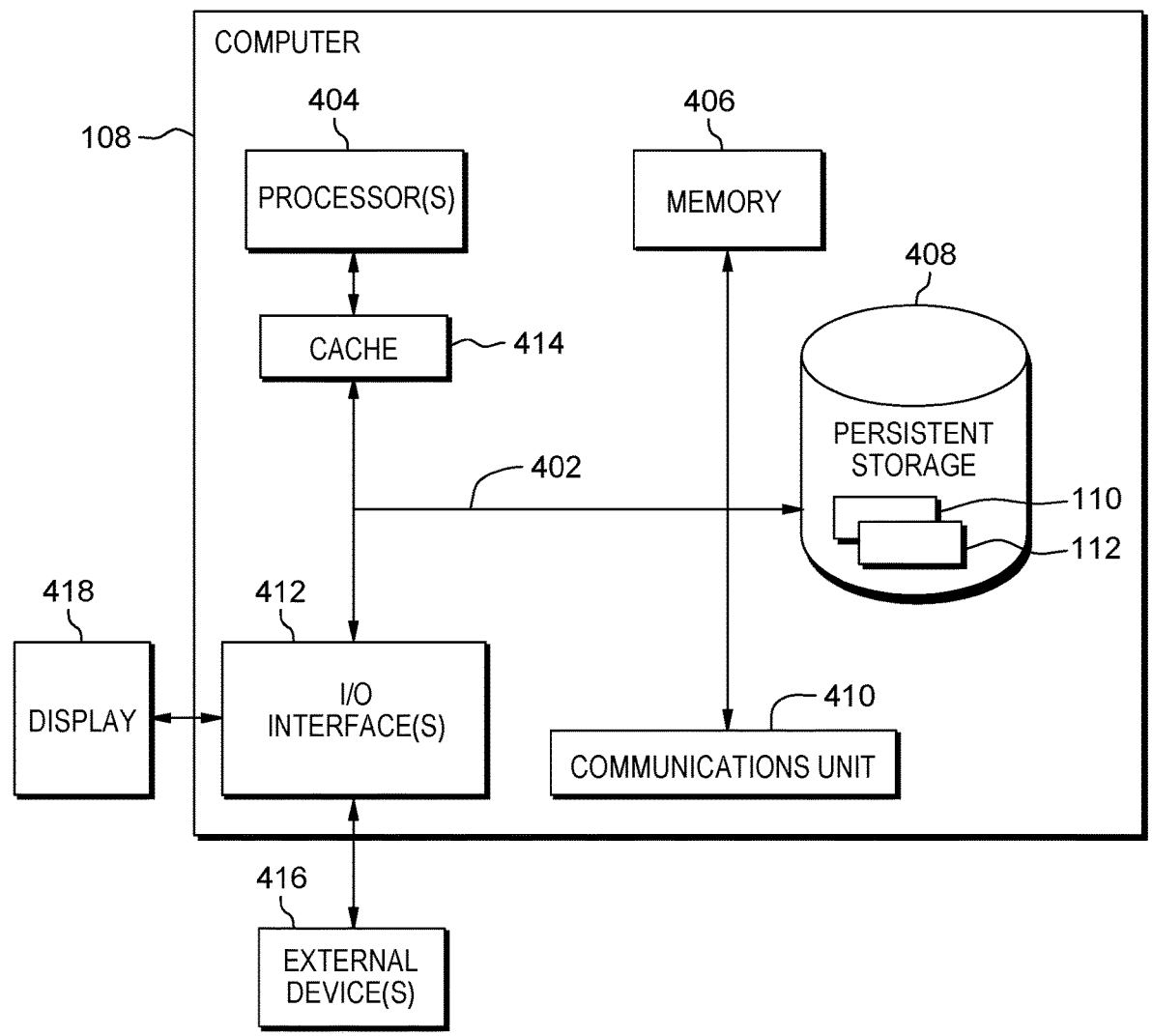
FIG. 4 depicts a block diagram of components of the server computer executing the coverage assessment program within the distributed data processing environment of FIG. 1, in accordance with an embodiment of the present invention.

FIG. 4 depicts a block diagram of components of server computer 108 within distributed data processing environment 100 of FIG. 1, in accordance with an embodiment of the present invention. It should be appreciated that FIG. 4 provides only an illustration of one implementation and does not imply any limitations with regard to the environments in which different embodiments can be implemented. Many modifications to the depicted environment can be made.

Server computer 108 can include processor(s) 404, cache 414, memory 406, persistent storage 408, communications unit 410, input/output (I/O) interface(s) 412 and communications fabric 402. Communications fabric 402 provides communications between cache 414, memory 406, persistent storage 408, communications unit 410, and input/output (I/O) interface(s) 412. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses.

Memory 406 and persistent storage 408 are computer readable storage media. In this embodiment, memory 406 includes random access memory (RAM). In general, memory 406 can include any suitable volatile or non-volatile computer readable storage media. Cache 414 is a fast memory that enhances the performance of processor(s) 404 by holding recently accessed data, and data near recently accessed data, from memory 406.

Program instructions and data used to practice embodiments of the present invention, e.g., coverage assessment program 110 and database 112, are stored in persistent storage 408 for execution and/or access by one or more of the respective processor(s) 404 of server computer 108 via cache 414. In this embodiment, persistent storage 408 includes a magnetic hard disk drive. Alternatively, or in addition to a magnetic hard disk drive, persistent storage 408 can include a solid-state hard drive, a semiconductor storage device, a read-only memory (ROM), an erasable programmable read-only memory (EPROM), a flash memory, or any other computer readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer readable storage medium that is also part of persistent storage 308.

Communications unit 410, in these examples, provides for communications with other data processing systems or devices, including resources of client computing device 104. In these examples, communications unit 410 includes one or more network interface cards. Communications unit 410 may provide communications through the use of either or both physical and wireless communications links. Coverage assessment program 110, database 112, and other programs and data used for implementation of the present invention, may be downloaded to persistent storage 408 of server computer 108 through communications unit 410.

I/O interface(s) 412 allows for input and output of data with other devices that may be connected to server computer 108. For example, I/O interface(s) 412 may provide a connection to external device(s) 416 such as a keyboard, a keypad, a touch screen, a microphone, a digital camera, and/or some other suitable input device. External device(s) 416 can also include portable computer readable storage media such as, for example, thumb drives, portable optical or magnetic disks, and memory cards. Software and data used to practice embodiments of the present invention, e.g., coverage assessment program 110 and database 112 on server computer 108, can be stored on such portable computer readable storage media and can be loaded onto persistent storage 408 via I/O interface(s) 412. I/O interface(s) 412 also connect to a display 418.

Display 418 provides a mechanism to display data to a user and may be, for example, a computer monitor. Display 318 can also function as a touchscreen, such as a display of a tablet computer.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 5:
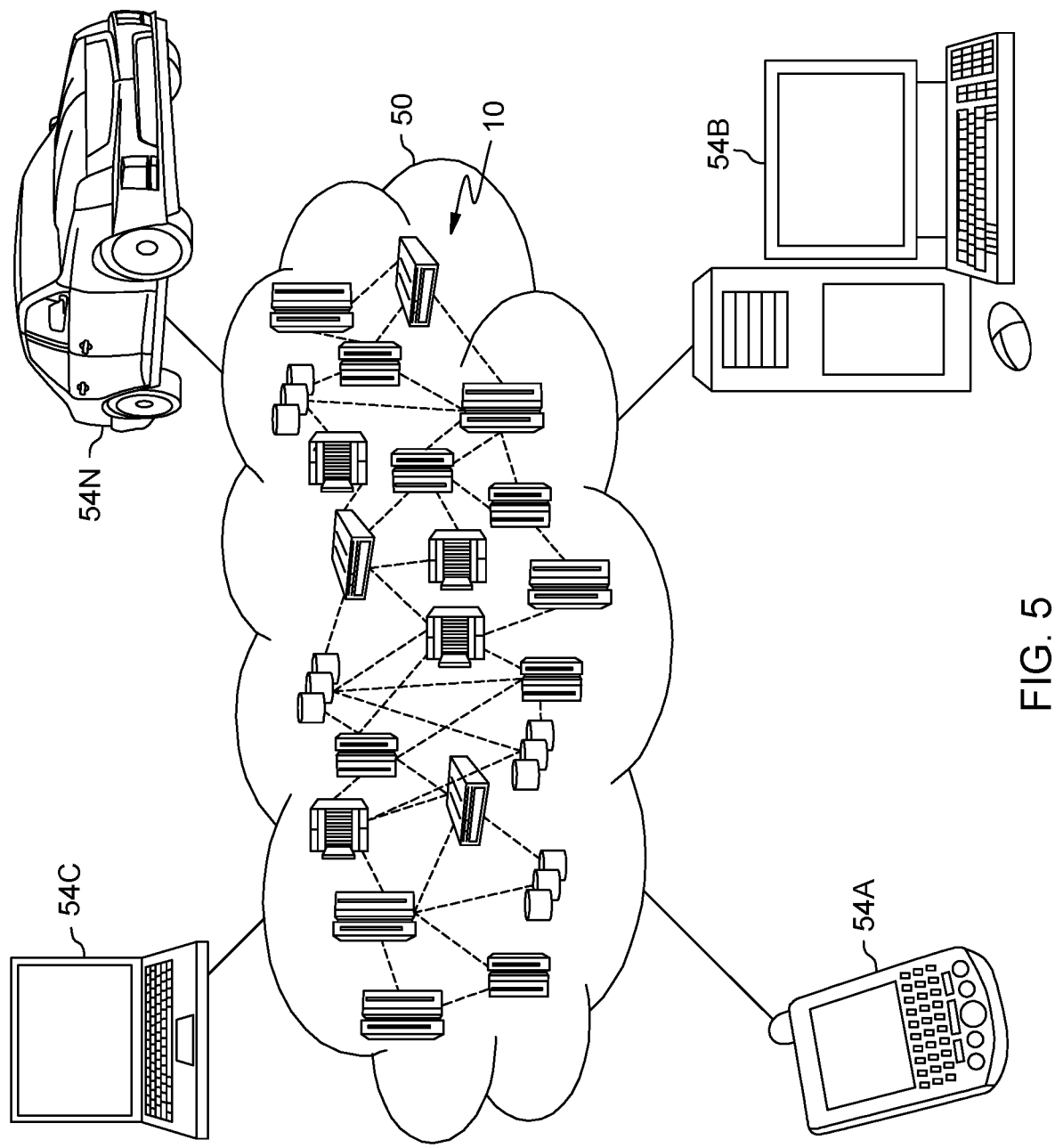
FIG. 5 depicts a cloud computing environment according to an embodiment of the present invention.

Referring now to FIG. 5, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. Server computer 108 may be one instance of node 10. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 6:
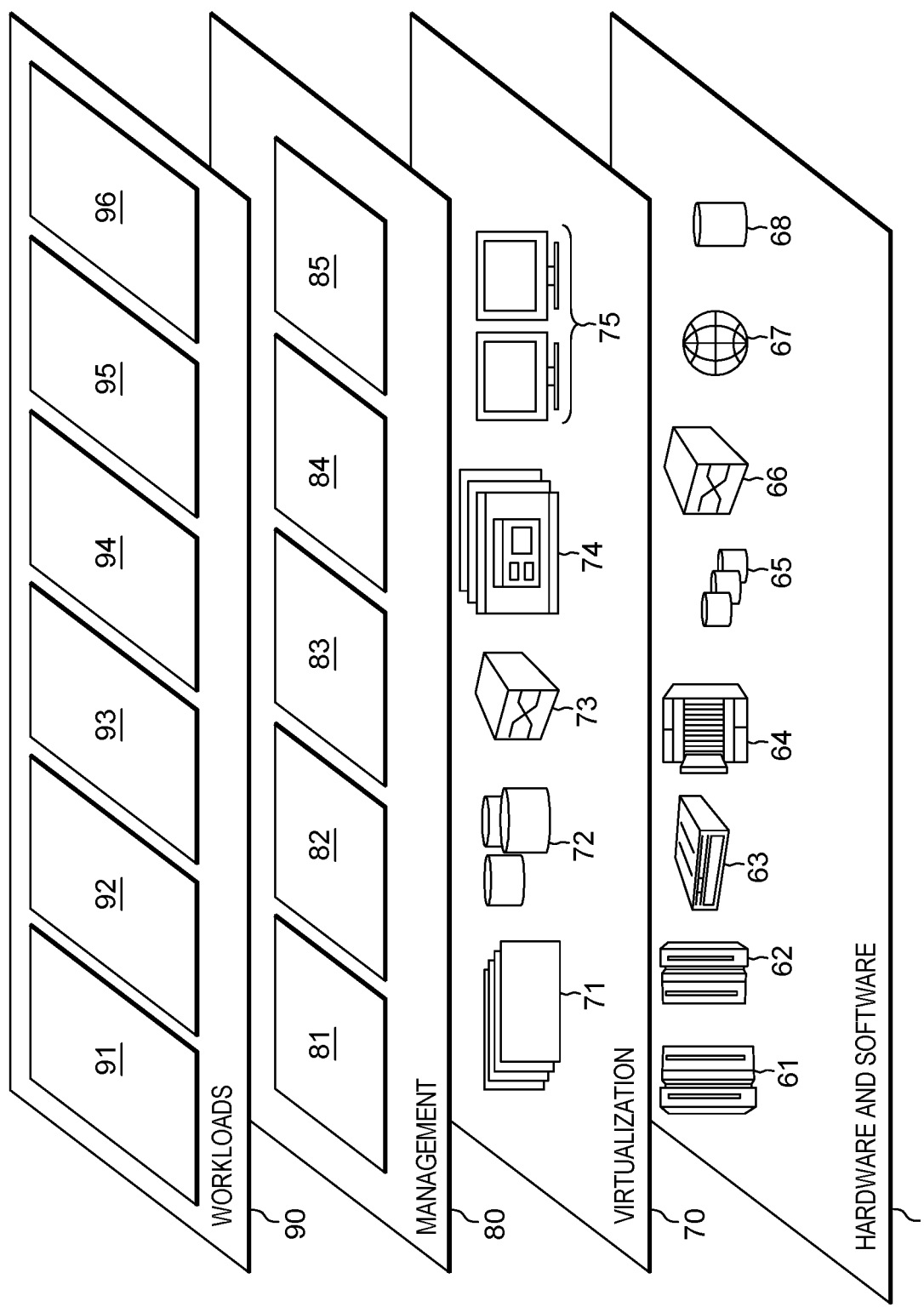
FIG. 6 depicts abstraction model layers according to an embodiment of the present invention.

Referring now to FIG. 6, a set of functional abstraction layers provided by cloud computing environment 50 (FIG. 1) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; coverage term processing 96; and coverage assessment program 110.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be any tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, a segment, or a portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method for parsing and analyzing contracts, the method comprising:
   receiving, by one or more computer processors, a policy agreement;
   parsing, by the one or more computer processors, the policy agreement for one or more terms;
   compiling, by the one or more computer processors, a list of items associated with the one or more terms in the policy agreement;
   associating, by the one or more computer processors, each item of the list of items with one or more categories, wherein each category of the one or more categories defines an extent of coverage for each item;
   determining, by the one or more computer processors, whether an item of a user is present in the list of items associated with the one or more terms in the policy agreement;
   responsive to determining that the item of the user is present in the list of items associated with the one or more parsed terms in the policy agreement, determining, by the one or more computer processors, the one or more categories associated with the item;

determining, by the one or more computer processors, the extent of coverage for the item of the user based on the determined one or more categories;

generating, by the one or more computer processors, one or more first rules associated with the extent of coverage associated with the item, wherein generating the one or more first rules associated with coverage terms for the item is achieved using a machine learning and a predictive analytics;

generating, by the one or more computer processors, one or more second rules associated with the item based on a predicted user behavior, wherein the predicted user behavior is predicted using a time-series forecast and a regression analysis based on a behavior history of the user;

creating, by the one or more computer processors, one or more item-specific responses upon a rule violation of the one or more rules;

monitoring, by the one or more computer processors, one or more data sources associated with the user;

determining, by the one or more computer processors, whether the rule violation has occurred based on the one or more data sources and the one or more first rules and the one or more second rules; and responsive to determining that the rule violation has occurred, executing, by the one or more computer processors, the one or more item-specific responses.

2. The method of claim 1, wherein determining whether the rule violation has occurred comprises:
determining, by the one or more computer processors, a geolocation associated with the user;
determining, by the one or more computer processors, whether the geolocation associated with the user falls outside of one or more allowed geolocations in the policy agreement; and
responsive to determining that the geolocation associated with the user falls outside of the one or more allowed geolocations, determining, by the one or more computer processors, that a rule violation has occurred.

3. The method of claim 1, wherein determining whether the rule violation has occurred further comprises:
determining, by the one or more computer processors, a current time associated with the user;
determining, by the one or more computer processors, whether the current time associated with the user falls outside of one or more allowed times in the policy agreement; and
responsive to determining that the current time associated with the user falls outside of the one or more allowed times, determining, by the one or more computer processors, that the rule violation has occurred.

4. The method of claim 1, wherein the one or more item-specific responses are selected from a group consisting of: a notification and an authorization hold.

5. The method of claim 1, further comprising:
sending, by the one or more computer processors, one or more coverage terms associated with the item to the user for review.

6. A computer program product for parsing and analyzing contracts, the computer program product comprising:
one or more computer readable storage devices and program instructions stored on the one or more computer readable storage devices, the stored program instructions comprising:
program instructions to receive a policy agreement;
program instructions to parse the policy agreement for one or more terms;
program instructions to compile a list of items associated with the one or more terms in the policy agreement;
program instructions to associate each item of the list of items with one or more categories, wherein each category of the one or more categories defines an extent of coverage for each item;
program instructions to determine whether an item of a user is present in the list of items associated with the one or more terms in the policy agreement;
responsive to determining that the item of the user is present in the list of items associated with the one or more parsed terms in the policy agreement, program instructions to determine the one or more categories associated with the item;
program instructions to determine the extent of coverage for the item of the user based on the determined one or more categories;
program instructions to generate one or more first rules associated with the extent of coverage associated with the item, wherein generating the one or more first rules associated with coverage terms for the item is achieved using a machine learning and a predictive analytics;
program instructions to generate one or more second rules associated with the item based on a predicted user behavior, wherein the predicted user behavior is predicted using a time-series forecast and a regression analysis based on a behavior history of the user;
program instructions to create one or more item-specific responses upon a rule violation of the one or more rules;
program instructions to monitor one or more data sources associated with the user,
program instructions to determine whether the rule violation has occurred based on the one or more data sources and the one or more first rules and the one or more second rules; and
responsive to determining that the rule violation has occurred, program instructions to execute the one or more item-specific responses.

7. The computer program product of claim 6, wherein determining whether the rule violation has occurred comprises:
program instructions to determine a geolocation associated with the user;
program instructions to determine whether the geolocation associated with the user falls outside of one or more allowed geolocations in the policy agreement; and
responsive to determining that the geolocation associated with the user falls outside of the one or more allowed geolocations, program instructions to determine that the rule violation has occurred.

8. The computer program product of claim 6, wherein determining whether the rule violation has occurred further comprises:
program instructions to determine a current time associated with the user;
program instructions to determine whether the current time associated with the user falls outside of one or more allowed times in the policy agreement; and
responsive to determining that the current time associated with the user falls outside of the one or more allowed times, program instructions to determine that a rule violation has occurred.

9. The computer program product of claim 6, wherein the one or more item-specific responses are selected from a group consisting of: a notification and an authorization hold.

10. The computer program product of claim 6, further comprising:
program instructions to send one or more coverage terms associated with the item to the user for review.

11. A computer system for parsing and analyzing contracts, the computer system comprising:
one or more computer processors;
one or more computer readable storage devices;
program instructions stored on the one or more computer readable storage devices for execution by at least one of the one or more computer processors, the stored program instructions comprising:
program instructions to receive a policy agreement;
program instructions to parse the policy agreement for one or more terms;
program instructions to compile a list of items associated with the one or more terms in the policy agreement;
program instructions to associate each item of the list of items with one or more categories, wherein each category of the one or more categories defines an extent of coverage for each item;
program instructions to determine whether an item of a user is present in the list of items associated with the one or more terms in the policy agreement;
responsive to determining that the item of the user is present in the list of items associated with the one or more parsed terms in the policy agreement, program instructions to determine the one or more categories associated with the item;
program instructions to determine the extent of coverage for the item of the user based on the determined one or more categories;
program instructions to generate one or more first rules associated with the extent of coverage associated with the item, wherein generating the one or more first rules associated with coverage terms for the item is achieved using a machine learning and a predictive analytics;
program instructions to generate one or more second rules associated with the item based on a predicted user behavior, wherein the predicted user behavior is predicted using a time-series forecast and a regression analysis based on a behavior history of the user;
program instructions to create one or more item-specific responses upon a rule violation of the one or more rules;
program instructions to monitor one or more data sources associated with the user;
program instructions to determine whether the rule violation has occurred based on the one or more data sources and the one or more first rules and the one or more second rules; and
responsive to determining that the rule violation has occurred, program instructions to execute the one or more item-specific responses.

12. The computer system of claim 11, wherein determining whether the rule violation has occurred comprises:
program instructions to determine a geolocation associated with the user;
program instructions to determine whether the geolocation associated with the user falls outside of one or more allowed geolocations in the policy agreement; and
responsive to determining that the geolocation associated with the user falls outside of the one or more allowed geolocations, program instructions to determine that the rule violation has occurred.

13. The computer system of claim 11, wherein determining whether the rule violation has occurred further comprises:
program instructions to determine a current time associated with the user;
program instructions to determine whether the current time associated with the user falls outside of one or more allowed times in the policy agreement; and
responsive to determining that the current time associated with the user falls outside of the one or more allowed times, program instructions to determine that a rule violation has occurred.

14. The computer system of claim 11, wherein the one or more item-specific responses are selected from a group consisting of: a notification and an authorization hold.

* * * * *